United States Patent [19]

De Vries et al.

[11] 4,181,505

[45] Jan. 1, 1980

[54] METHOD FOR THE WORK-HARDENING OF DIAMONDS AND PRODUCT THEREOF

[75] Inventors: Robert C. De Vries, Burnt Hills; Francis P. Bundy, Alplaus; Robert H. Wentorf, Jr., Schenectady, all of N.Y.

[73] Assignee: General Electric Company, Schenectady, N.Y.

[21] Appl. No.: 896,931

[22] Filed: Apr. 17, 1978

Related U.S. Application Data

[63] Continuation of Ser. No. 474,719, May 30, 1974, abandoned.

[51] Int. Cl.$^2$ ................................. B24D 3/02
[52] U.S. Cl. ................................. 51/307; 51/309; 264/319; 423/446
[58] Field of Search ............ 51/307, 309, 308; 427/446; 264/319, 332

[56] References Cited

U.S. PATENT DOCUMENTS

| | | | |
|---|---|---|---|
| 3,136,615 | 6/1964 | Bovenkerk et al. | 51/309 |
| 3,141,746 | 7/1964 | De Lai | 51/309 |
| 3,407,445 | 10/1968 | Strong | 51/307 |
| 3,423,177 | 1/1969 | Bovenkerk | 51/309 |
| 3,574,580 | 4/1971 | Stromberg et al. | 51/309 |
| 3,767,371 | 10/1973 | Wentorf et al. | 51/307 |

Primary Examiner—Donald J. Arnold
Attorney, Agent, or Firm—Jane M. Binkowski; Joseph T. Cohen; Leo I. MaLossi

[57] ABSTRACT

Extensive development of deformation bands in diamond crystals results from subjecting diamond material properly confined to reduce or eliminate brittle fracture thereof to the simultaneous application of high pressure and temperature in a defined region on the carbon phase diagram, the pressures and temperatures being incapable of bringing about significant crystal-to-crystal bonding of diamond. Plastic deformation resulting in work-hardening of these diamonds can be made to occur at temperatures as low as 900° C. at pressures of about 60 kb. A work-hardened diamond for use in a single-point diamond tool would, for example, be prepared by embedding the diamond in diamond powder to fill the volume thereby inhibiting brittle fracture of the diamond being work-hardened.

11 Claims, 2 Drawing Figures

METHOD FOR THE WORK-HARDENING OF DIAMONDS AND PRODUCT THEREOF

This is a Continuation of pending application Ser. No. 474,719 filed May 30, 1974 now abandoned in the names of Robert C. DeVries, Francis P. Bundy and Robert H. Wentorf, Jr.

BACKGROUND OF THE INVENTION

Polished sections of framesite, a naturally-occurring bort type diamond present certain surface striations. The nature of these striations is reported in the article "Evidence for Plastic Deformation in the Natural Polycrystalline Diamond, Framesite" by R. C. DeVries [Mat. Res. Bull. Vol. 8, pp 733–742, 1973]. It is pointed out therein that the narrow zones represented by these striations are strain-hardened, are harder than any orientation of the diamond matrix and appear to indicate the presense of oriented deformation bands within the grains. It is concluded in the article that the microstructure of framesite diamond is the result of plastic deformation of diamond grains therein under conditions such that brittle fracture was inhibited.

U.S. Pat. Nos. 3,141,746—DeLai and 3,136,615—Bovenkerk et al are typical of prior art disclosures relating to the preparation of diamond compacts. In both of these patents the provision of a bonding medium together with preformed diamond crystals enables the unification of the diamonds under the simultaneous application of appropriate pressure and temperature conditions. Compact formation is, as is explained hereinbelow, the antithesis of the invention described herein.

DESCRIPTION OF THE INVENTION

The work-hardening of diamond crystals, as evidenced by the extensive development of deformation bands in the surfaces of the crystals, is accomplished by filling a volume solely with diamond crystals (in other words, no bonding medium is employed) or solely with diamond crystals embedded in a powdered material selected from the group consisting of diamond and cubic boron nitride and then subjecting the filled volume to the simultaneous application of high pressure and temperature in a region defined on the carbon phase diagram. Pressure and temperature conditions employed in this process are incapable of bringing about crystal-to-crystal bonding of diamond (or of cubic boron nitride powder, if employed) of any consequence. Thus, after the temperature and pressure have been reduced, the work-hardened diamonds are readily separated for use in diamond tools, for example, saws or single-point tools.

The pressures and temperatures employed may range, for example, from about 10 kb at about 1200° C. to about 60 kb at about 900° C. When embedding a larger diamond crystal to be work-hardened in powdered material as noted above, brittle fracture thereof is inhibited. As will be further defined herein, the Region of Plastic Deformation in which the work-hardening of diamonds may be conducted includes temperature/pressure conditions both in and out of the diamond stable region. Preferred operation is in that portion of the Region of Plastic Deformation below a pressure of 55 kb and at a temperature of less than 1500° C.

The size designation for diamond crystals as expressed herein is for the largest linear crystal dimension. The abbreviation "CBN" is used herein for the term "cubic boron nitride".

BRIEF DESCRIPTION OF THE DRAWING

The exact nature of this invention as well as objects and advantages thereof will be readily apparent from consideration of the following specification relating to the annexed drawing in which.

MANNER AND PROCESS OF MAKING AND USING THE INVENTION

Figure 1:
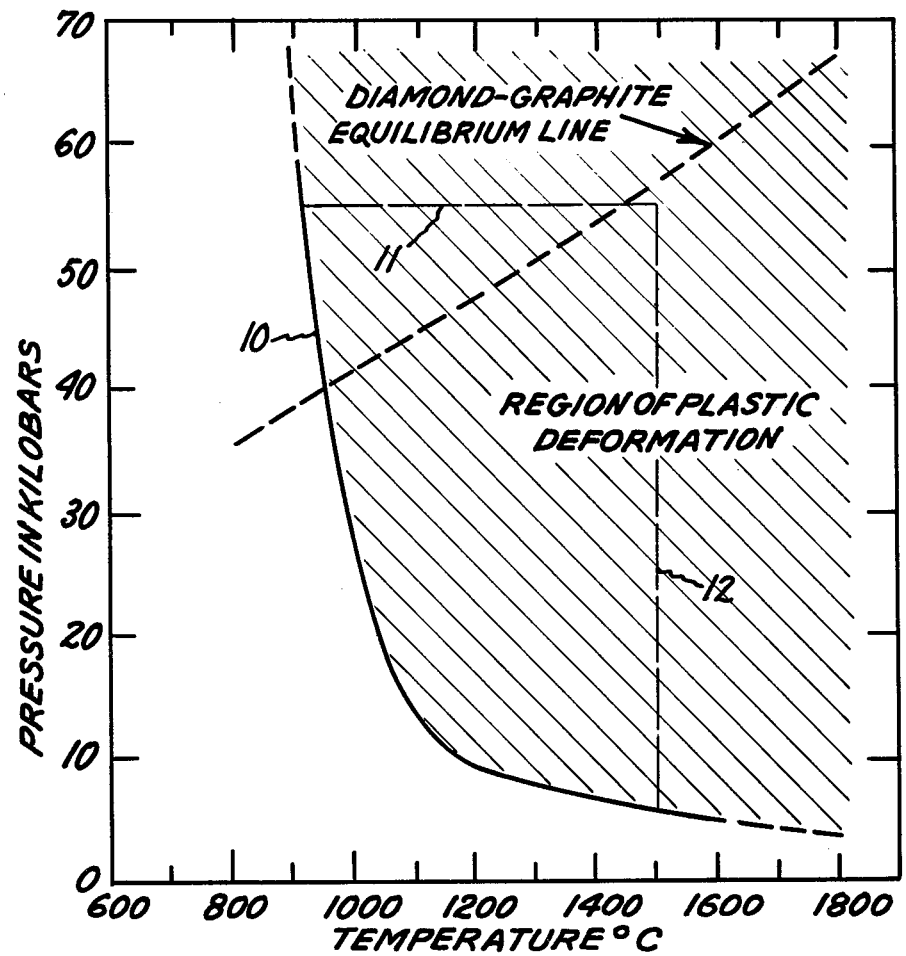
FIG. 1 represents the phase diagram of carbon having defined thereon the Region of Plastic Deformation in which the instant invention may be practiced and FIG. 2 is a Nomarski interference contrast photomicrograph showing strain-hardened zones or lamellae projecting above a surface of a diamond, which is approximately a (135) plane.

One preferred form of a high pressure, high temperature apparatus in which the instant invention may be practiced is the subject of U.S. Pat. No. 2,941,248—Hall (incorporated by reference) and is also disclosed in numerous other patents and publications. Those skilled in the art should, therefore, be well acquainted with this "belt-type" apparatus and, for this reason, no effort has been made to illustrate the apparatus in the drawings.

Essentially, the apparatus consists of a pair of cemented tungsten carbide punches disposed to either side of an intermediate belt or die member of the same material. The space between the two punches and the die is occupied by the reaction vessel and surrounding gasket/insulation assemblies therefor. High pressures are generated in the reaction vessel from the compressive forces caused by the relative movement of the co-axially disposed punches toward each other within the die. Means are provided for heating the reaction vessel during the application of pressure.

Various reaction vessel configurations are shown in the patent literature (e.g. U.S. Pat. No. 3,423,177—Bovenkerk, incorporated by reference). These reaction vessels, or cells, usually consist of several interfitting cylindrical members and end plugs for containing the reaction system in the centermost cylinder. In indirectly heated reaction vessels one of the cylindrical members is made of graphite, which is heated by the passage of electrical current therethrough. The reaction mass is heated thereby.

Operational techniques for simultaneously applying both high pressures and high temperatures in such apparatus as well known to those skilled in the superpressure art. There are, of course, various other apparatuses capable of providing the required pressures and temperatures that may be employed within the scope of this invention.

Diamond is a brittle material and cleaves easily along (111) planes when subjected to shearing stress. In order to produce a work-hardened diamond, it is necessary to confine each diamond crystal during the pressure applications so that brittle fracture is inhibited as much as possible. Transmission of the applied pressure to the diamond crystal itself need not be truly hydrostatic, but the compacted crystal must be sufficiently well confined and the force distribution thereover must be uniform enough to avoid creating a large unopposed shear force acting in any one direction.

An optimum size range for the diamond crystal to be work-hardened is from about 5 micrometers to about 5 millimeters. A diamond crystal that is too large may crack, if it is not properly confined and/or is permitted to receive a non-uniform pressure distribution during conduct of the process. If the diamond crystal is too small, it may crack completely or may merely adjust its position to the application of pressure and not deform. Both naturally-occurring (Type I and Type II) and synthetic (Type II) diamonds have been work-hardened by this process.

Inhibition of brittle fracture of a given diamond in order to maximize recoverable yield during work-hardening thereof may be accomplished as follows:

(a) diamonds in the size range from about 5 micrometers to about 250 micrometers should constitute the entire charge filling the reaction vessel; each crystal provides the requisite support for adjacent crystals; use of a gradation of sizes in the upper end of this range in a given charge is preferable, but not critical;

(b) diamonds in the size range from about 250 micrometers to about 5 mm should be embedded in diamond or CBN powder, the combination of larger crystal and powder constituting the entire charge filling the reaction volume and (c) diamonds in a size range (from about 250 to about 500 micrometers) may be work-hardened using either (a) or (b) above.

In the conduct of the method of this invention using the "belt" apparatus the charge is placed in and fills a cylindrical sleeve made of pyrophyllite, salt, hexagonal boron nitride or similar material, the sleeve is closed with end plugs (preferably of the same material as the cylindrical sleeve, or enclosure). The sleeve is then enclosed in the balance of the reaction vessel (e.g. within a graphite heater sleeve which, in turn, is surrounded by a sleeve of pyrophyllite or salt).

Various hard embedding powder materials have been tried (boron carbide, silicon carbide, alumina, pyrophyllite, tungsten carbide, diamond and cubic boron nitride. Diamond and cubic boron nitride were the only ones of these embedment materials successfully employed in the deformation of diamond by the present invention. The size of particles for the embedment material should be in the range of 1/10 to 1/100 of the longest linear dimension of the embedded diamond.

After assembly of the reaction vessel and introduction thereof in the high pressure, high temperature apparatus within the gasket/insulation assemblies, pressure and temperature are raised simultaneously or separately (5–10 kb/min; 50°–200° C./min) to a level in the Region of Plastic Deformation defined in FIG. 1 and are held for a period of at least about 1 minute, e.g. in the range of from about 1 to about 30 minutes. Electric power to the heater sleeve is shut off and the sample quickly cools (in less than a minute) to below 50° C. The pressure is then released at a rate of about 10 kb/min. to one atmosphere for pressures of 10 kb and above. For pressures below 10 kb the release of pressure and the return to atmospheric pressure is almost immediate.

As may be seen in FIG. 1, the Region of Plastic Deformation extends into both the diamond-stable and the graphite-stable regions (i.e. above and below the line indicated as the Diamond-Graphite Equilibrium Line). In case of operation at pressure/temperature conditions below the diamond-stable region, but in the Region of Plastic Deformation, some graphitization of the work-hardened diamond occurs simultaneously with the deformation. However, in a 5-minute run, the amount of graphitization has been found to be negligible. In a 15-minute run in a pyrophyllite enclosure, a thin surface layer of graphite has often been seen, probably due to impurities entering the diamond charge from the pyrophyllite.

It is not uncommon for some breakage of diamond crystals to occur during work-hardening, however, diamond-to-diamond bonding is to be avoided.

Initially, diamond crystals were polished on at least one surface prior to being subjected to deformation in order to establish the initial microstructure. The diamond crystals were repolished on the same face after the deformation process to provide a comparison. Later, it was determined that the presence of new deformation zones could be clearly detected by microscopic observation alone without prior or subsequent polishing. Crystals that are initially clear become cloudy and less transparent after deformation, a change that is usually apparent at 20×–50× magnification.

To insure recovery of work-hardened diamonds intact from the embedment material, placement of the diamond in the embedment material in relation to the direction of the compressive force should be considered. Thus, an octahedron placed in the cell with a set of (111) faces disposed perpendicular to the direction of the compressive force and then work-hardened will almost always delaminate, because the crystal is gripped sufficiently well by the embedment material to be pulled apart by cleavage along the (111) plane as the punches of the press separate on pressure release. On the other hand with a [100] axis of the octahedron disposed parallel to the axis of the pistons (direction of compressive force), most crystals are recovered intact after the release of pressure, because the surrounding embedment powder pulls away from the crystal along the pointed pyramids on either side of the girdle of the octahedron. Similarly, cube-shaped crystals should be oriented with a [111] axis parallel to the axis of the pistons even though this will orient a (111) cleavage plane perpendicular to the axis of the pistons. If the [100] axis of a cube-shaped crystal is placed parallel to the axis of the pistons, the crystal has a high probability of delamination. Using these geometrical criteria in placing the crystal in a cell, the recovery of work-hardened diamond crystals completely intact from their embedment is optimized.

Figure 2:

After work-hardening, when the pressure and temperature have been reduced to ambient, the reaction vessel is removed from the apparatus and the diamond crystal content of the charge is recovered (i.e. diamond crystals are separated from each other or from the embedment powder). The indications of deformation as seen by microscopic observation appear as straight lines slightly elevated above the surface of the host diamond and may be clearly seen in the photomicrograph of FIG. 2 extending in four different directions. Each of these slip lines is the manifestation at the surface of the diamond of a deformation zone or lamella. In general, the depth of the deformed region is shallow (about 100 microns) but it is also common to find lamellae penetrating almost all the way through a crystal as large as one millimeter. The presence of lamellae projecting above the surface of a work-hardened diamond crystal in four directions (for four different crystal orientations) is typified by numerical designations 11, 12, 13, 14.

The deformation lamellae introduced into diamond crystals by the practice of this invention appear to be identical in all respects to those earlier seen in framesite. The lamellae were found to be associated with regions of high strain based on observation between crossed polarizers and the fact that the lamellae etch preferentially in fused salt.

Deformation lamellae or slip lines were found to have a higher abrasion resistance than even the (111) surface of the host diamond (the most abrasive resistant face thereof) and, this is the reason that these zones project above the surface of the diamond after polishing.

EXAMPLE 1

A natural Type I diamond about 1 mm in greatest dimension was embedded in 230/270 mesh synthetic diamond in a high pressure cell. This assemblage was subjected to a final pressure of 60 kb and a temperature of 800° C. (in the diamond stable region). The pressure and temperature were raised simultaneously at rates of about 3 kb/min and 50° C./min, respectively. After 5 minutes at the peak temperature and pressure, the temperature and pressure were decreased to room conditions and the crystal was removed from the embedding diamond powder. The diamond crystal showed no evidence of plastic deformation.

EXAMPLE 2

The same experimental techniques as in Example 1 were used using another diamond crystal measuring about 1 mm. The peak pressure-temperature conditions were 60 kb and 1000° C., respectively. These conditions are in the diamond stable region. Upon removal of the diamond crystal from the polycrystalline diamond powder matrix, evidence of plastic deformation was easy to see. Slip lines were present, and the crystal was no longer clear.

EXAMPLE 3

A Type I natural diamond (about 1 mm) was embedded in 230/270 mesh diamond grains in a high pressure cell. The pressure was raised to 20 kb in about 7 minutes simultaneously with a temperature rise to 1100° C. in the same time. The assembly was held at the peak pressure and temperature for 5 minutes. These conditions are in the diamond stable region. Upon removal of the diamond from the cell after quenching the power input to the internal heater and then releasing the pressure, slip lines were observed in the crystal.

EXAMPLE 4

A Type I natural diamond (about 1 mm) was embedded in 230/270 mesh diamond grains in a high pressure cell. The pressure was raised to 20 kb in about 7 minutes simultaneously with a temperature rise to 900° C. in the same time. The assemblage was held at the peak pressure and temperature for 5 minutes. The diamond crystal had not been deformed by this process—i.e. no slip lines could be seen. In the short duration of this experiment no graphitization was seen even though the pressure-temperature conditions were in the graphite stable region.

EXAMPLE 5

A Type II natural diamond (about 1 mm) embedded in 230/270 mesh synthetic diamond was raised to 50 kb and 1200° C. at respective rates of about 3 kb/min and about 100° C./min simultaneously. These maximum pressure-temperature conditions were maintained for 8 minutes and then decreased to normal ambient conditions. The crystal was plastically deformed as evidenced by a heavy concentration of slip lines.

In the examples set forth in Table 1 below a total of about 7.9 gm of clean 25/30 mesh synthetic equiaxed diamond crystals were subjected to pressure-temperature conditions in the Region of Plastic Deformation simultaneously applied for the times indicated. These diamonds, which were of approximately equal size, were processed in 16 runs consisting of about 0.5 gm each in a belt-type apparatus. In each instance, after removal of the reaction vessel from the apparatus the work-hardened diamonds were easily recoverable as discrete crystals for later use. No graphitization was seen. Of the work-hardened diamonds recovered about 73% (5.8 gm) remained on a 40 mesh sieve, the remaining 27% being finer-grained due to crushing during the deformation step.

TABLE 1

| Run #'s | P(kb) | T(°C.) | Time (minutes) |
| --- | --- | --- | --- |
| 73-138 to 73-141 | 40 | 1200 | 30 |
| 73-142 to 73-145 | 45 | 1300 | 30 |
| 73-146 to 73-149 | 51 | 1400 | 30 |
| 73-150 to 73-153 | 57.5 | 1400 | 30 |

The physical appearance of a work-hardened diamond is noticeably different from its appearance before the deformation bands were introduced. These changes in appearance apply whether or not the original clean crystal has been reduced in size by crushing thereof. For smaller crystals observation at relatively low power magnification may be needed to make this assessment. Natural diamond crystals, which may be colored, but are usually transparent, became cloudy or frosty in appearance with attendant loss in transparency. The frosty appearance is the result of diffuse light-scattering from the many new surfaces created by deformation of the crystal (i.e. the slip lines shown in FIG. 2). Synthetic diamonds are usually colored (yellow, green, greenish-yellow, blue, blue-green, etc.), have surface etching from contact with the catalyst-solvent during manufacture and generally contain impurities in varying degrees. The regions of clean synthetic diamonds not etched or occupied by impurities are usually transparent. After work-hardening, however, a definite reduction in transparency is noted, being replaced by a frosty appearance due to diffuse light-scattering that prevails for the reason described above.

In the case in which diamond crystals of about the same size are subjected to deformation usually some faces of each work-hardened crystal remains unchanged in whole or in part depending upon the extent to which the crystals have been able to press against each other. However, there is no need in having each face plastically deformed to be able to produce tools that can present substantial amounts of work-hardened crystalline area to the workpiece in an abrading or grinding operation.

Once these work-hardened diamonds have been recovered as discrete crystals from the high pressure, high temperature apparatus, they can be sized and graded and used industrially in the same manner as such diamonds have previously been used (i.e. in grinding wheels, saws, files, single point tools, etc.) to abrade or grind workpieces.

BEST MODE CONTEMPLATED

It is preferred to operate in that portion of the Region of Plastic Deformation (FIG. 1) defined by line 10, line 11 (at 55 kb) and line 12 (at 1500° C.). In those instances in which an embedment material is employed, relatively coarse diamond powder (230–400 mesh) is preferred as the embedding medium.

Optimum operating conditions of pressure and temperature lie in the diamond-stable region of the preferred portion of the Region of Plastic Deformation. This would be an area on the carbon phase diagram defined by line 10, line 11 and the Diamond-Graphite Equilibrium Line.

The process of this invention is best applied to clean equiaxed (i.e. blocky) diamond crystals. Inclusions present in the crystals and/or the presence of etching on surfaces of the crystals do not appear to have an effect on the plastic deformation step.

It is preferred, but not essential, to simultaneously raise pressure and temperature to the operating condition. Shortest effective deformation times are preferred.

When diamond crystals in the 250–500 micrometer range are used as the charge (non-embedment arrangement) to the reaction vessel, packing of these crystals should be optimized by using a gradation of crystal sizes.

The term "clean" as used herein (and in the claims set forth hereinbelow) means being free of exposed reactive constituents.

What is claimed is:

1. A method of producing a free discrete work-hardened diamond crystal consisting essentially of the steps of:
   (a) filling an enclosure with a charge consisting of free discrete diamond crystals wherein the largest linear dimension ranges in size from about 5 to 500 micrometers, said charge with said diamond crystals in direct contact with each other filling said enclosure so that each said crystal provides the requisite support for adjacent crystals for application of pressure thereon sufficiently uniform to substantially inhibit brittle fracture of said diamond crystals,
   (b) subjecting said enclosure and said charge to the simultaneous application of pressure and temperature conditions located in the Region of Plastic Deformation as defined in the carbon phase diagram of FIG. 1 wherein the pressure ranges from 5 kilobars to 70 kilobars and the temperature ranges from 900° C. to 1800° C. for a period of time ranging from about one minute to 30 minutes whereby at least one face of at least one diamond crystal is work-hardened but whereby no significant crystal-to-crystal bonding of diamond is produced, said work-hardened face, when polished, showing a plurality of straight bands elevated from said polished face, said straight bands being a manifestation of strain-hardened lamellae extending into the crystal and being composed of discrete work-hardened crystalline material, said work-hardened face having an abrasion resistance higher than that of a non-work-hardened face of said crystal, said charge of free discrete diamond crystals undergoing no significant bonding to each other,
   (c) reducing the temperature to ambient,
   (d) reducing the pressure to atmospheric pressure, and
   (e) recovering the resulting free discrete work-hardened diamond crystal, said recovered work-hardened diamond crystal being at least significantly fracture-free.

2. The method of claim 1 wherein said recovered work-hardened diamond crystal is frosty or cloudy.

3. The method of claim 1 wherein said recovered work-hardened diamond crystal is a natural diamond crystal.

4. The method of claim 1 wherein said recovered work-hardened crystal is a synthetic diamond crystal.

5. A method of producing a free discrete work-hardened diamond crystal consisting essentially of the steps of:
   (a) filling an enclosure with a charge consisting of at least one free discrete diamond crystal wherein the largest linear dimension ranges in size from about 250 micrometers to about 5000 micrometers confined sufficiently in embeddment material and in direct contact with said embeddment material for application of pressure on said diamond crystal sufficiently uniform to substantially inhibit brittle fracture of said diamond crystal, said embeddment material being selected from the group consisting of diamond and cubic boron nitride having a size ranging from 1/10 to 1/100 of the largest linear dimension of said confined diamond,
   (b) subjecting said enclosure and said charge to the simultaneous application of pressure and temperature conditions located in the Region of Plastic Deformation as defined in the carbon phase diaphragm of FIG. 1 wherein the pressure ranges from 5 kilobars to 70 kilobars and the temperature ranges from 900° C. to 1800° C. for a period of time ranging from about one minute to 30 minutes whereby at least one face of said diamond crystal ranging in size from about 250 micrometers to about 5000 micrometers is work-hardened but whereby no significant bonding between said diamond and said embeddment material is produced, said work-hardened face, when polished, showing a plurality of straight bands elevated from said polished face, said straight bands being a manifestation of strain-hardened lamellae extending into the crystal and being composed of discrete work-hardened crystalline material, said work-hardened face having an abrasion resistance higher than that of a non-work-hardened face of said crystal, said work-hardened diamond crystal undergoing no significant bonding within said charge,
   (c) reducing the temperature to ambient,
   (d) reducing the pressure to atmospheric pressure, and
   (e) recovering the resulting free discrete work-hardened diamond crystal, said recovered free discrete work-hardened diamond crystal being at least significantly fracture-free.

6. The method of claim 5 wherein said recovered free discrete work-hardened diamond crystal is frosty or cloudy.

7. The method of claim 5 wherein said recovered free discrete work-hardened diamond crystal is a natural diamond crystal.

8. The method of claim 5 wherein said recovered free discrete work-hardened diamond crystal is a synthetic diamond crystal.

9. A free discrete diamond crystal which ranges in size from about 5 micrometers to about 5000 micrometers, said crystal being at least significantly fracture-free and having at least one work-hardened face with an abrasion resistance higher than that of a non-work-hardened face of said free crystal, said work-hardened face, when polished, displaying a plurality of straight bands elevated from said polished work-hardened face, said straight bands being a manifestation of strain-hardened lamellae extending into said crystal and being composed of discrete work-hardened crystalline material, said free discrete diamond crystal being produced by the method of claim 1.

10. The free diamond crystal of claim 9 which is a synthetic diamond crystal.

11. A free discrete diamond crystal which ranges in size from about 5 micrometers to about 5000 micrometers, said crystal being at least significantly fracture-free and having at least one work-hardened face with an abrasion resistance higher than that of a non-work-hardened face of said free crystal, said work-hardened face, when polished, displaying a plurality of straight bands elevated from said polished work-hardened face, said straight bands being a manifestation of strain-hardened lamellae extending into said crystal and being composed of discrete work-hardened crystalline material, said free discrete diamond crystal being produced by the method of claim 5.

* * * * *